(12) United States Patent
Kang et al.

(10) Patent No.: US 6,744,843 B2
(45) Date of Patent: Jun. 1, 2004

(54) SIDE-SLOTTED NOZZLE TYPE DOUBLE SHEET SPACER GRID FOR NUCLEAR FUEL ASSEMBLIES

(75) Inventors: Heung Seok Kang, Daejeon (KR); Kyung Ho Yoon, Daejeon (KR); Hyung Kyu Kim, Daejeon (KR); Kee Nam Song, Daejeon (KR); Yeon Ho Jung, Daejeon (KR); Tae Hyun Chun, Daejeon (KR); Dong Seok Oh, Daejeon (KR); Wang Kee In, Daejeon (KR)

(73) Assignees: Korea Atomic Energy Research Institute, Daejeon (KR); Korea Hydro & Nuclear Power Co., Ltd., Seoul (KR)

( * ) Notice: Subject to any disclaimer, the term of this patent is extended or adjusted under 35 U.S.C. 154(b) by 30 days.

(21) Appl. No.: 10/452,030

(22) Filed: May 30, 2003

(65) Prior Publication Data

US 2004/0086072 A1 May 6, 2004

(30) Foreign Application Priority Data

Oct. 30, 2002 (KR) ................................ 10-2002-0066627

(51) Int. Cl.$^7$ ................................................. G21C 3/34
(52) U.S. Cl. ....................................... 376/439; 376/442
(58) Field of Search ................................. 376/439, 442

(56) References Cited

U.S. PATENT DOCUMENTS

| | | |
|---|---|---|
| 4,058,436 A | 11/1977 | Anthony |
| 4,692,302 A | 9/1987 | DeMario et al. |
| 4,702,881 A | 10/1987 | Weiland et al. |
| 4,726,926 A | 2/1988 | Patterson et al. |
| 4,728,489 A | 3/1988 | Hatfield |
| 4,849,161 A * | 7/1989 | Brown et al. ............... 376/439 |
| 5,084,237 A * | 1/1992 | Patterson et al. ........... 376/439 |
| 5,243,634 A | 9/1993 | Bryan |
| 6,130,927 A | 10/2000 | Kang et al. |

* cited by examiner

Primary Examiner—Harvey E. Behrend
(74) Attorney, Agent, or Firm—Bachman & LaPointe, P.C.

(57) ABSTRACT

A side-slotted nozzle type double sheet spacer grid for nuclear fuel assemblies is disclosed. The spacer grid includes intersecting inner strips and four perimeter strips. Each inner strip has unit strip parts, each fabricated by integrating two unit sheet parts together into a single structure, such that the two unit sheet parts face each other and a nozzle type coolant channel is defined between the two unit sheet parts. Each perimeter strip is fabricated by integrating an inner thin sheet having the unit sheet parts with a flat outer thin sheet having a width corresponding to the width of the inner thin sheet into a single structure. The coolant channel has one or more outlets formed by cutting an upper portion of one of the two unit sheet parts of each unit strip part. Each unit sheet part has a slot longitudinally formed on each side surface of a spring that is projected from the unit sheet part to support a fuel rod within a four-walled cell. The spacer grid thus effectively deflects and mixes coolants together to improve the heat transfer effect between fuel rods and coolants, and enhances its strength to effectively resist laterally directed forces acting thereon, and remarkably improves spring performance of its fuel rod support parts, thus accomplishing desired soundness of the fuel assemblies.

7 Claims, 11 Drawing Sheets

--Fig. 1--
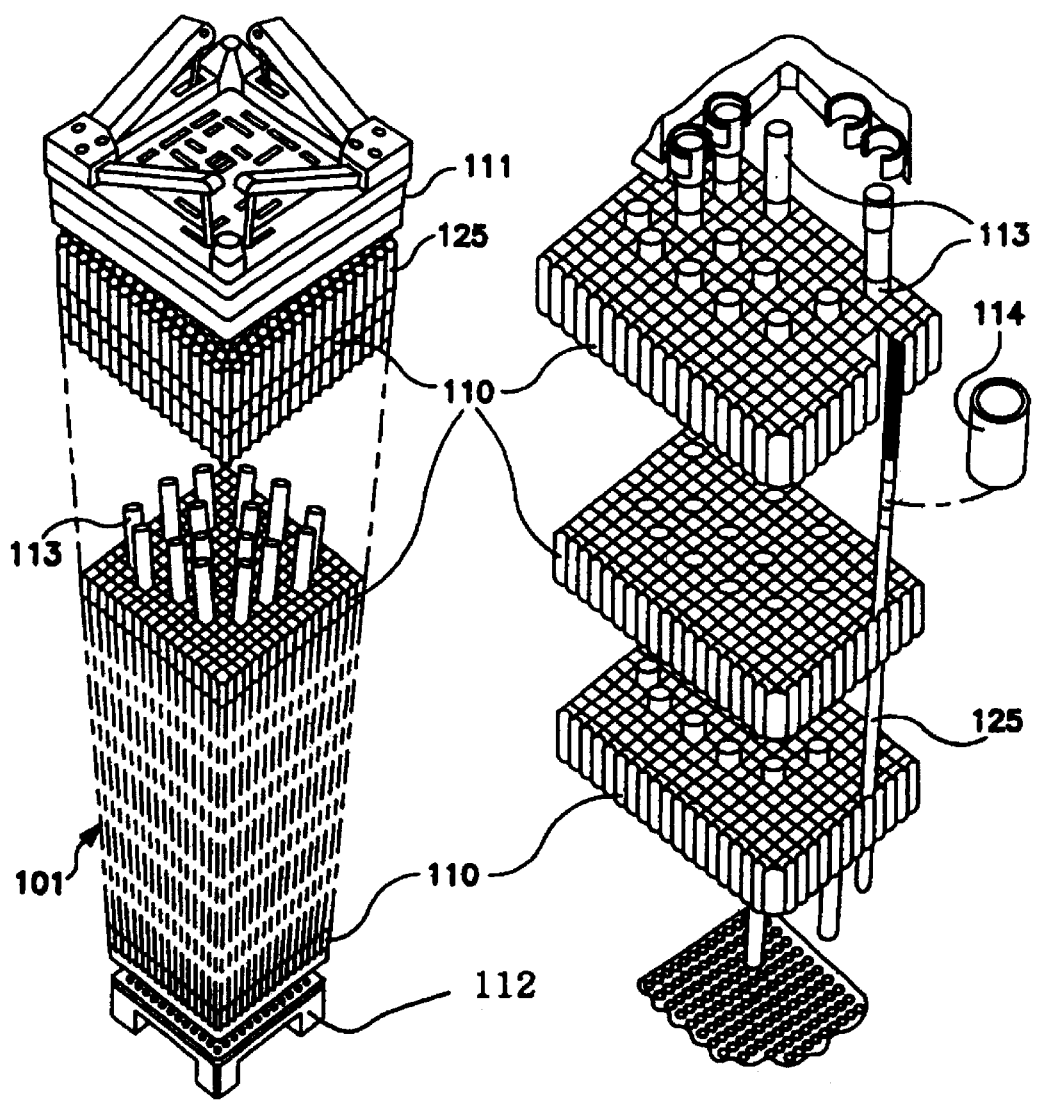
Contemporary Art

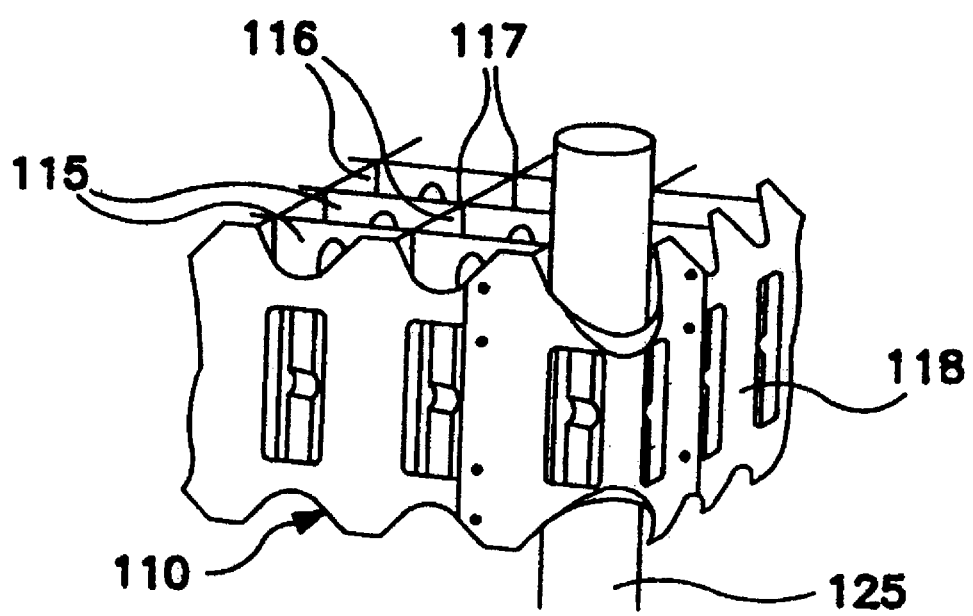
--Fig. 2--
Contemporary Art

--Fig. 3--
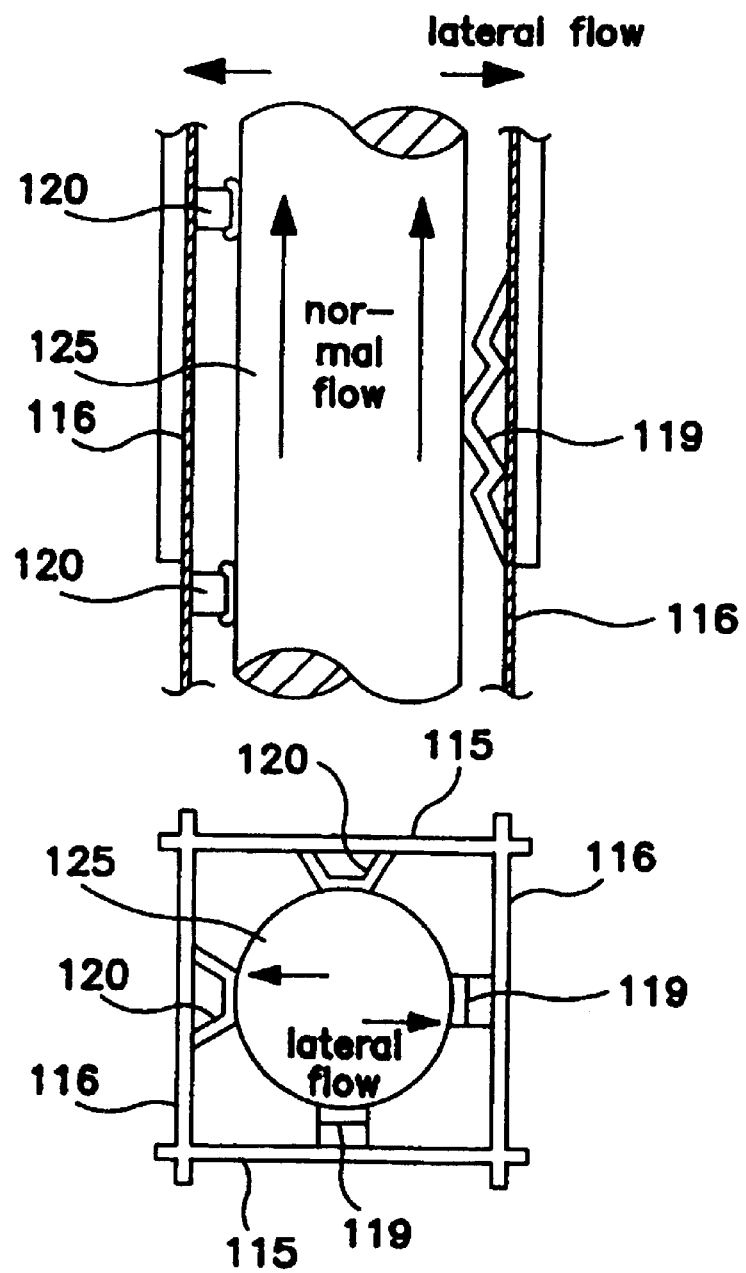
Contemporary Art

--Fig. 4--
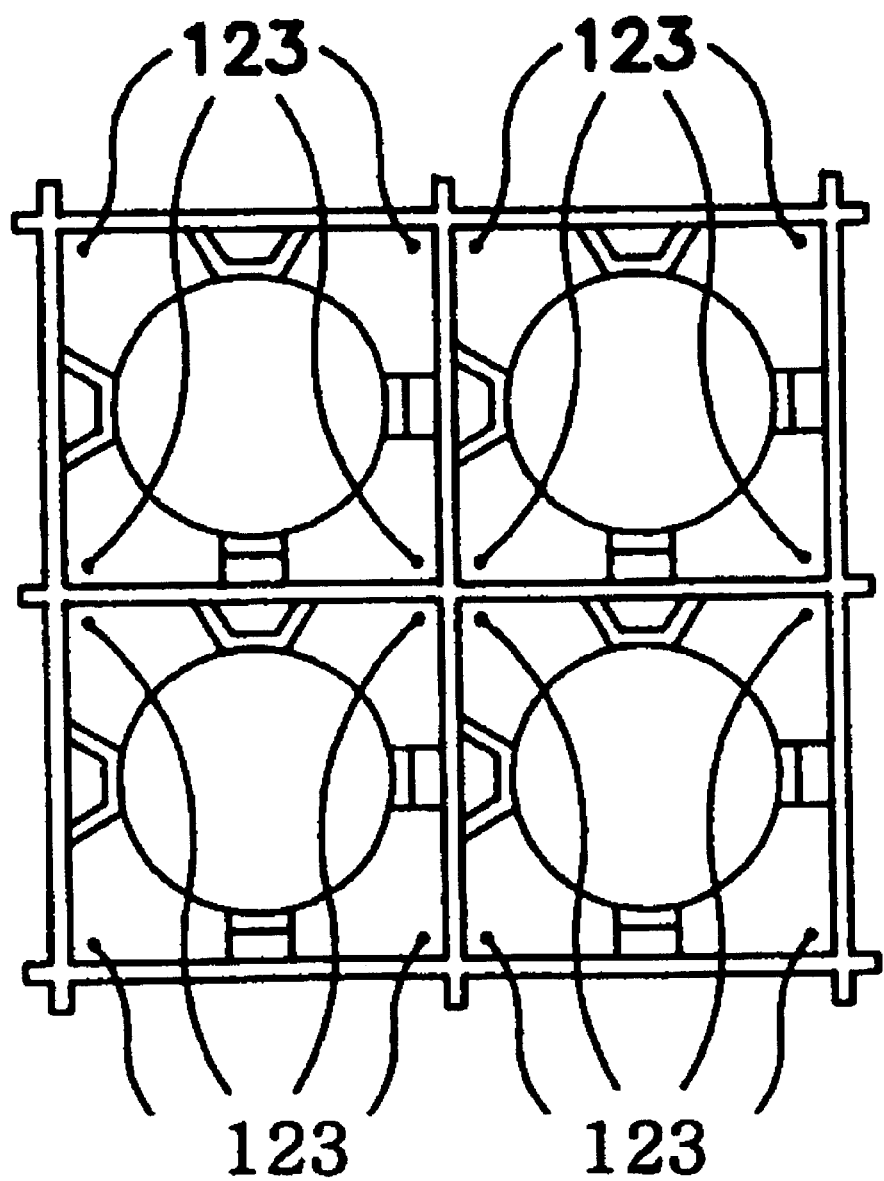
Contemporary Art

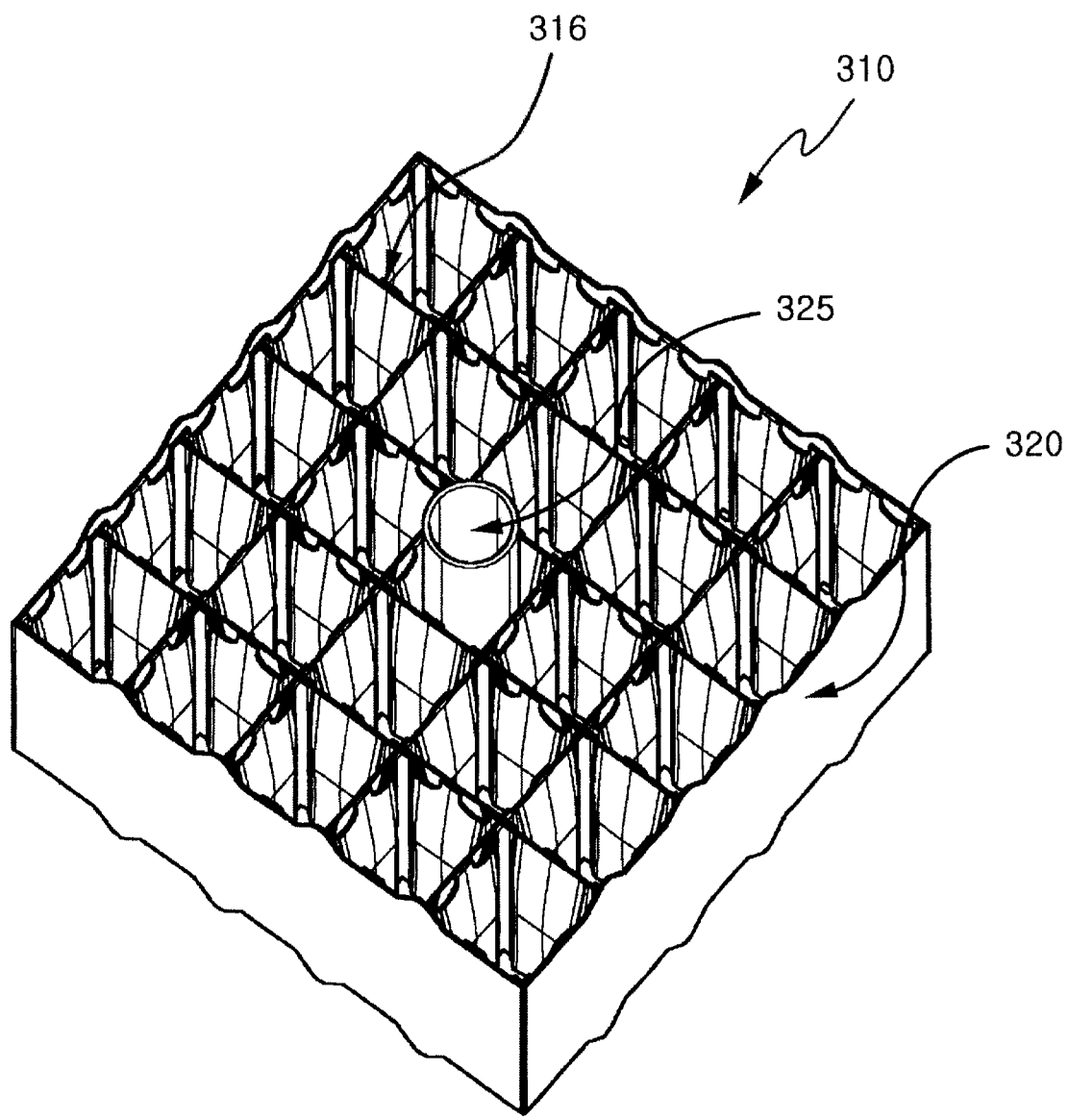
--Fig. 5--

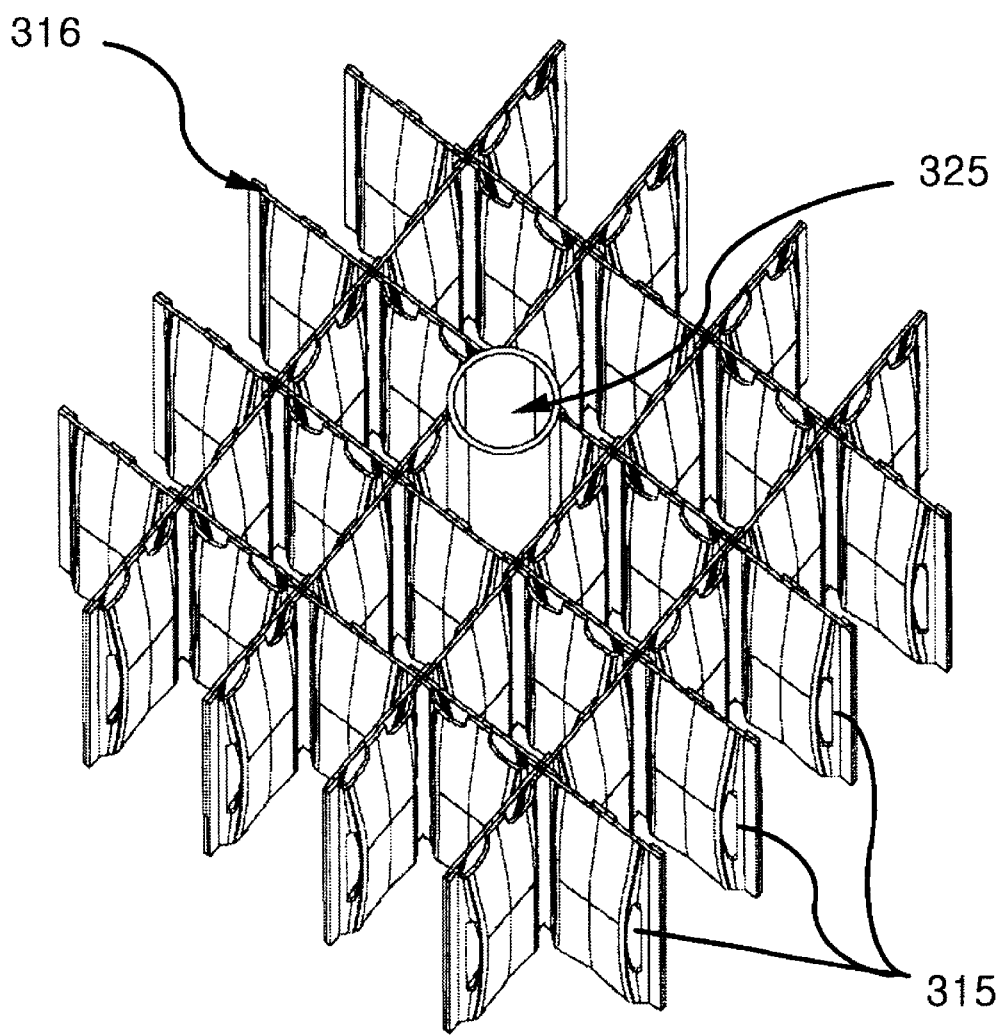
--Fig. 6--

--Fig. 7--
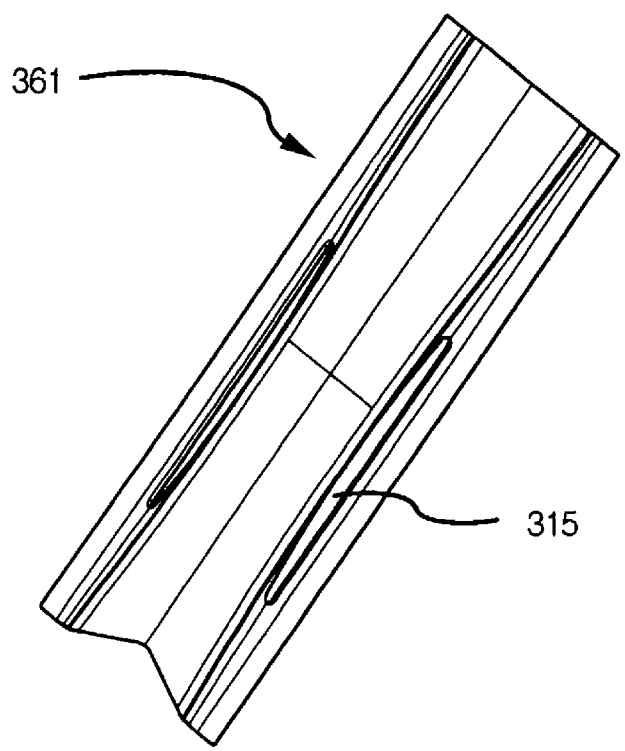
--Fig. 8--
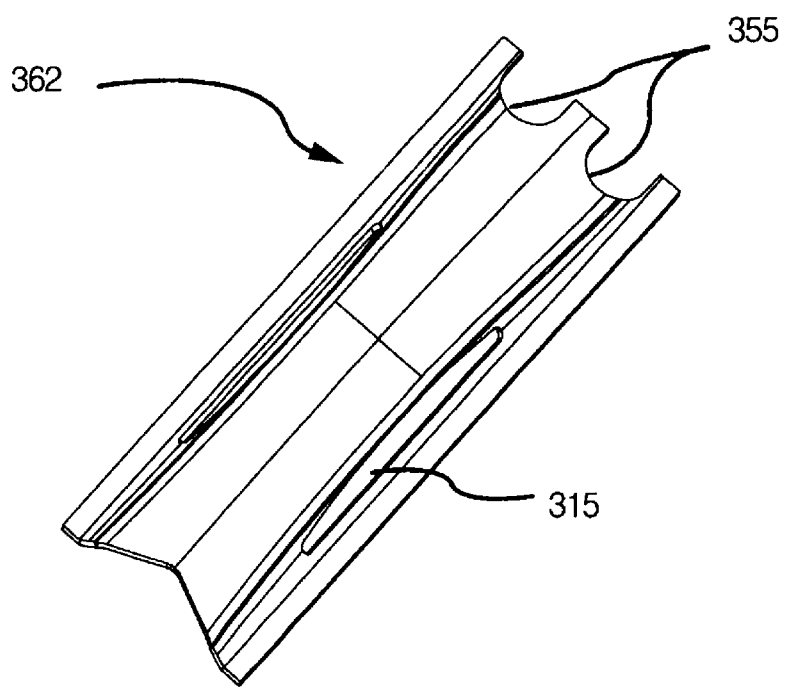

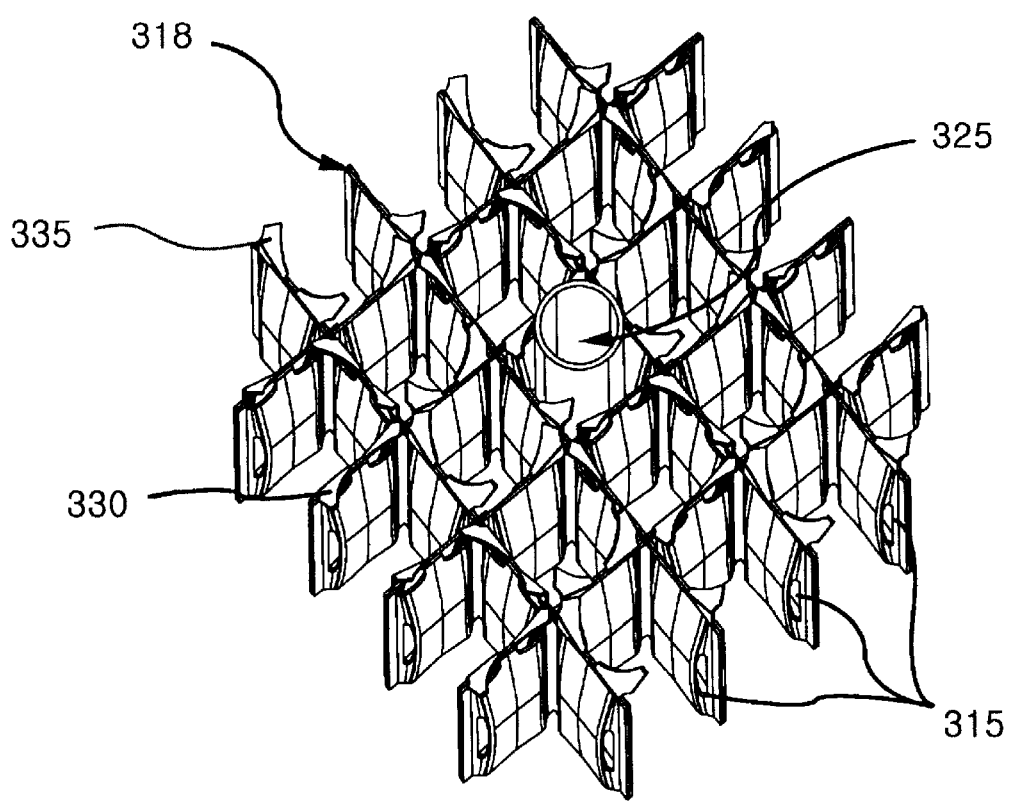
--Fig. 9--

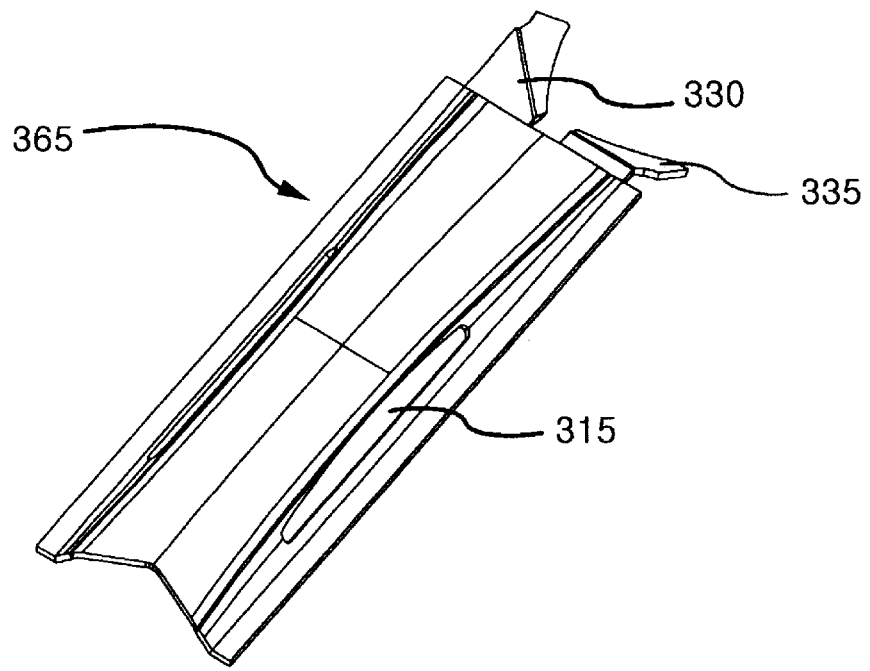
--Fig. 10--
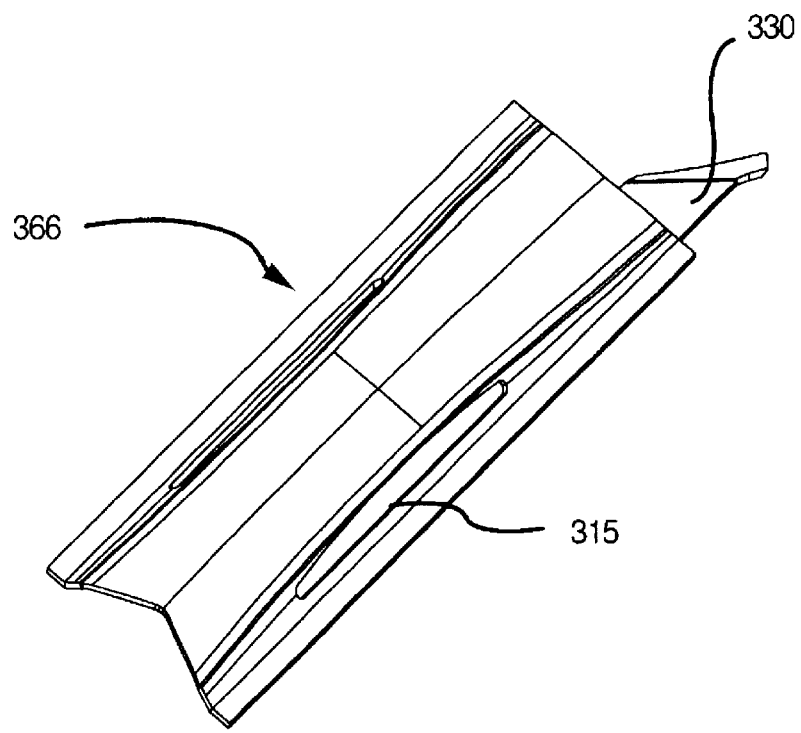
--Fig. 11--

--Fig. 12--
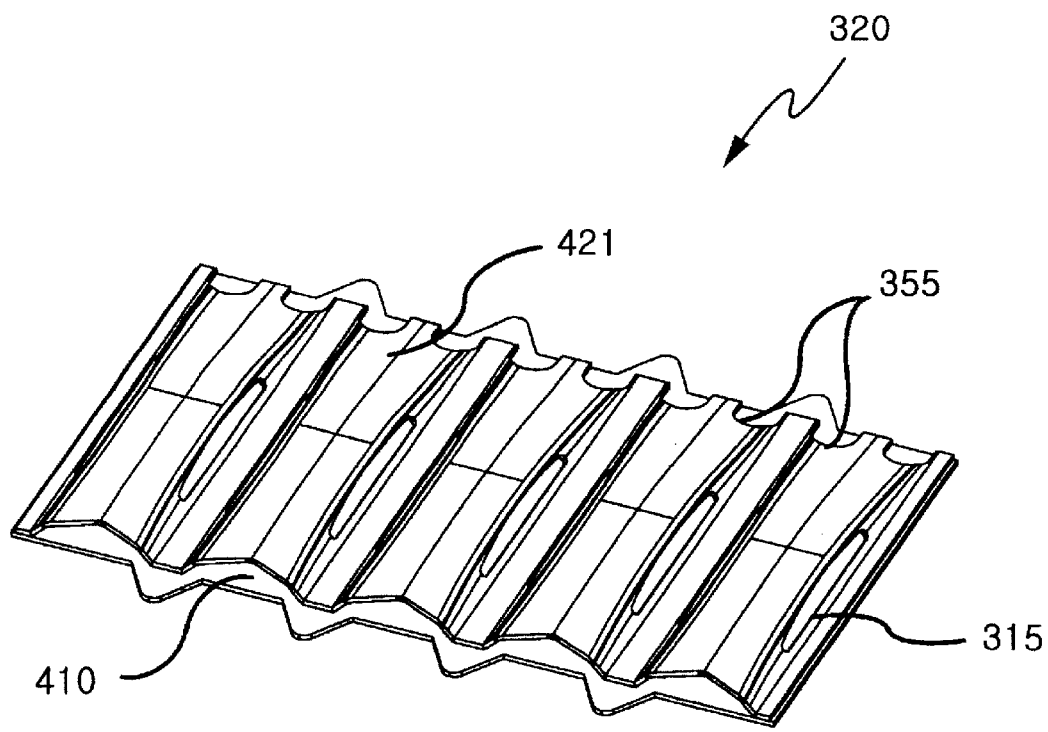
--Fig. 13--
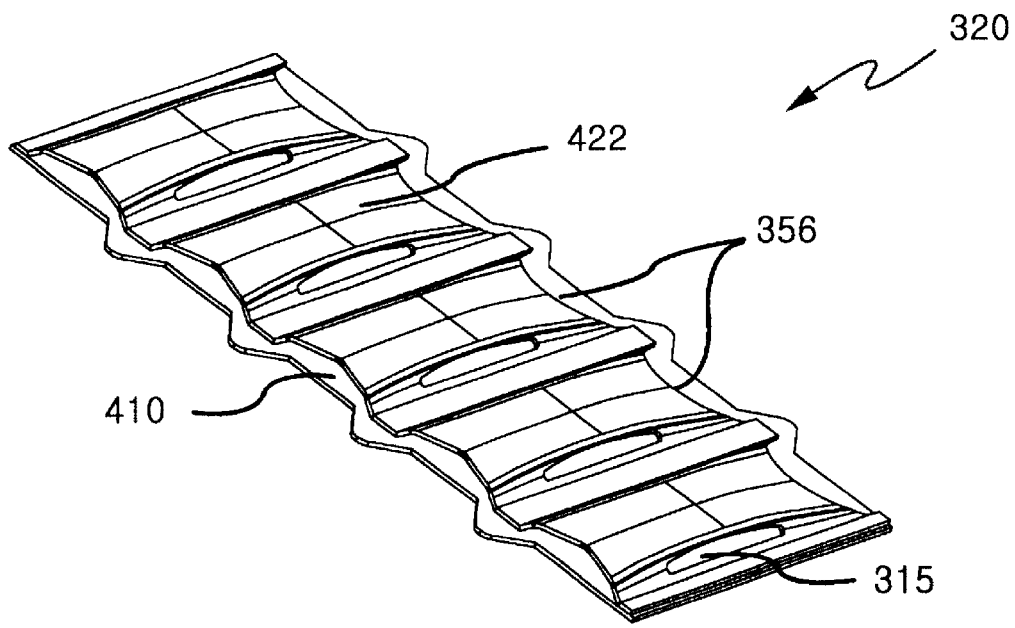

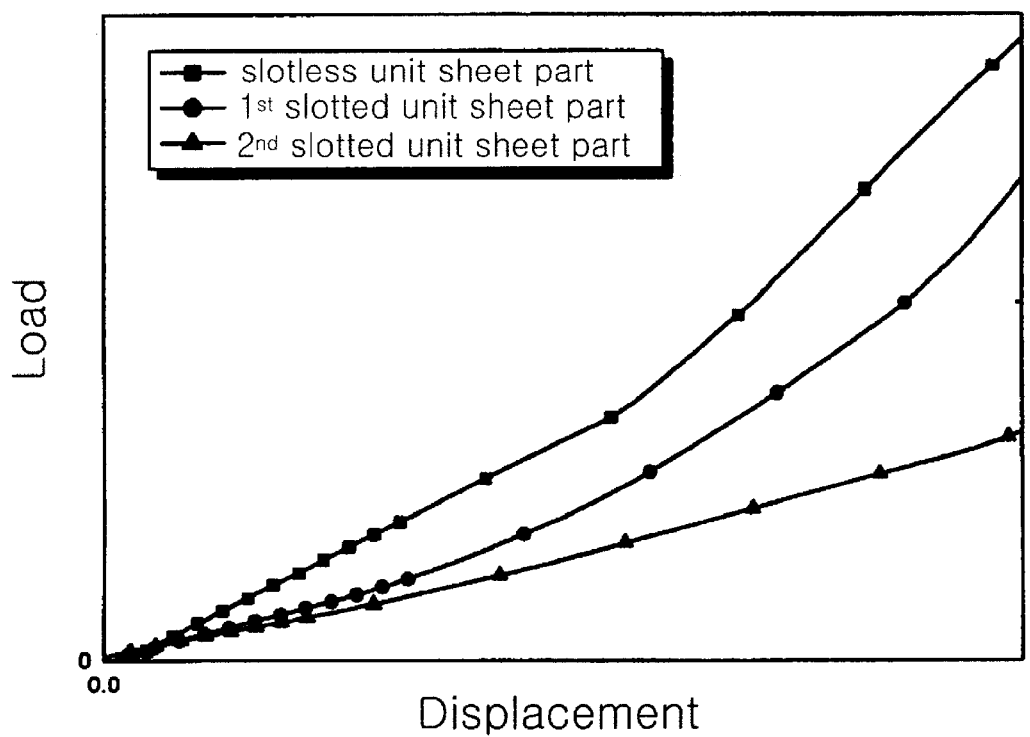
--Fig. 14--

SIDE-SLOTTED NOZZLE TYPE DOUBLE SHEET SPACER GRID FOR NUCLEAR FUEL ASSEMBLIES

BACKGROUND OF THE INVENTION

1. Field of the Invention

The present invention relates, in general, to spacer grids used for receiving and supporting fuel rods in nuclear fuel assemblies and, more particularly, to a side-slotted nozzle type double sheet spacer grid used in such fuel assemblies and designed to effectively deflect and mix coolants together so as to improve the heat transfer effect between the fuel rods and the coolants, and also designed to enhance its fuel rod support performance so as to effectively protect the fuel rods from vibration and fretting wear, and enhance its strength to effectively resist laterally directed forces acting thereon, and remarkably improve the spring performance of its support parts directly supporting the fuel rods, thus accomplishing desired soundness of the fuel assemblies.

2. Description of the Prior Art

In typical nuclear reactors, a plurality of elongated nuclear fuel rods 125 are parallelly arranged at regular intervals in a fuel assembly 101 having a square cross-section. In such a case, for example, fourteen, fifteen, sixteen or seventeen fuel rods 125 are arranged along each side of the square cross-section at regular intervals, thus forming a 14×14, 15×15, 16×16, or 17×17 array as shown in FIG. 1.

In order to receive and support the fuel rods 125 within the nuclear fuel assembly 101, a plurality of single sheet spacer grids 110 are used. In order to produce each single sheet spacer grid 110, a plurality of inner strips intersect together at right angles to form an egg-crate pattern, prior to being welded at their intersections. Thereafter, the periphery of the spacer grid 110 is encircled with four perimeter strips. The top and bottom of the fuel assembly 101 are, thereafter, covered with top and bottom pallets 111 and 112. Therefore, the nuclear fuel assembly 101 is protected from any external loads acting on the top and bottom thereof. In the fuel assembly 101, the spacer grids 110 and the pallets 111 and 112 are integrated into a single structure using a plurality of guide tubes 113. The elongated fuel rods 125, received and supported within the fuel assembly 101 by the spacer grids 110, are typically fabricated such that a fissionable fuel material, such as uranium core 114, is contained in a hermetically sealed elongated zircaloy tube, known as the cladding.

The above spacer grids 110 are each fabricated as follows. As best seen in FIG. 2, two sets of single sheet inner strips 115 and 116, each having a plurality of notches at regularly spaced positions, are assembled with each other by intersecting the two sets of strips 115 and 116 at the notches, thus forming a plurality of four-walled cells. Each of the cells has four intersections 117. The assembled strips 115 and 116 are, thereafter, welded together at the intersections 117 prior to being encircled with the perimeter strips 118. A desired spacer grid 110 with such four-walled cells is thus fabricated.

As shown in FIG. 3, a plurality of positioning springs 119 and a plurality of positioning dimples 120 are integrally formed on or attached to the inner strips 115 and 116. In such a case, the springs 119 and the dimples 120 extend inwardly with respect to each of the four-walled cells. The dimples 120 are more rigid than the springs 119. In each of the four-walled cells, the positioning springs 119 force a fuel rod 125 against associated dimples 120, thus elastically positioning and supporting the fuel rod 125 at four points within each of the cells.

In such a typical nuclear fuel assembly 101, a plurality of single sheet spacer grids 110 having the above-mentioned structure are regularly arranged along the axes of the fuel rods 125, as shown in FIG. 1, thus receiving and supporting the fuel rods 125 within the fuel assembly 101 at multiple points. That is, the spacer grids 110 act as a multi-point support means for receiving and supporting the fuel rods 125 within a nuclear fuel assembly 101.

In the typical nuclear fuel assembly 101, the positioning springs 119 elastically and slightly force the fuel rods 119 against the dimples 120 such that the fuel rods 125 are slidable on the support points of both the springs 119 and the dimples 120 when the fuel rods 125 are elongated due to thermal expansion or irradiation-induced growth of the fuel rods 125 within the fuel assembly 101.

When the fuel rods 125 are fixed to the spacer grids 110 at the support points of the grids 110, the fuel rods 125 may be bent at portions between the support points of the grids 110 due to the thermal expansion or the irradiation-induced growth, so that the fuel rods 125 may fail to maintain the designed intervals between them. In such a case, the cross-sectional areas of coolant passages, defined between the fuel rods 125 to allow coolant to flow through them as shown in FIG. 4, are partly increased or reduced.

In some typical nuclear reactors using water as coolant, such as in the case of the nuclear reactors currently used in Korea, water receives thermal energy from the fuel rods 125 prior to converting the thermal energy into desired electric energy through a plurality of processes.

During an operation of a nuclear fuel assembly 101 of such a reactor, water or liquid coolant is primarily introduced into the fuel assembly 101 through an opening formed on the core supporting lower plate of the reactor. In the fuel assembly 101, the coolant flows upwardly through the coolant passages, defined between the fuel rods 125, and receives thermal energy from the hot fuel rods 125.

The sectioned configuration of the coolant passages formed in the fuel assembly 101 is shown in FIG. 4.

In a conventional nuclear reactor, the amounts of thermal energy generated from different portions of a nuclear fuel assembly 101 are not equal to each other. Since the fuel assembly 101 has a rectangular cross-section, with a plurality of elongated, parallel fuel rods 125 having a circular cross-section closely set within the assembly 101 while being spaced apart from each other at irregular radial intervals, the temperature of coolant flowing around the fuel rods 125 is variable in accordance with positions of coolant currents relative to the rods 125.

That is, the amount of thermal energy received by water flowing around the corners 123 of each four-walled cell is less than that received by water flowing around the fuel rods 125. The coolant passages of typical fuel assemblies 101 thus undesirably have low temperature regions.

Such low temperature regions reduce the thermal efficiency of the nuclear reactor. The coolant passages of the fuel assemblies 101 may also have partially overheated regions at positions adjacent to the fuel rods 125 having a high temperature. Such partially overheated regions deteriorate soundness of the fuel assemblies 101.

In order to prevent such partially overheated regions from existing in a nuclear fuel assembly, it is necessary to design the spacer grid such that a uniform temperature distribution is generated in the fuel assembly. The spacer grid must also be designed to effectively deflect and mix the coolant within the fuel assembly. Such effectively mixed coolant ensures a uniform increase in enthalpy, and maximizes the core output.

Typical examples of such designed spacer grids are disclosed in U.S. Pat. No. 4,728,489 (corresponding to Korean Patent Publication No. 91-1978) and U.S. Pat. No. 4,692,302 (corresponding to Korean Patent Publication No. 91-7921).

In the spacer grids disclosed in the above-mentioned patents, so-called "mixing blades" or "vanes" are attached along the upper edges of the intersecting strips of each spacer grid, and are used for mixing coolants within the fuel assembly. That is, the mixing blades or vanes allow the coolant to flow laterally, in addition to the normal flow in an axial direction, as shown in FIG. 3, and so the coolants are effectively mixed with each other between the coolant passages and between the lower temperature regions and the partially overheated regions of the fuel assembly.

In the prior art, the techniques for mixing the coolants with each other between the coolant passages and between the lower temperature regions and the partially overheated regions of the fuel assembly using such mixing blades or vanes are classified into two types: the first technique using large-scaled mixing blades for creating a lateral flow of coolant and the second technique using vanes provided at the intersections for creating a swirl flow of coolant. In the first technique, the coolants, axially flowing along the elongated fuel rods within a fuel assembly, partially collide against the large-scaled mixing blades so as to flow laterally, in addition to the normal flow in the axial direction. In the second technique, several vanes are provided at the intersections of the spacer grid for creating the swirl flow of coolants.

However, the conventional two techniques for mixing the coolants with each other between the coolant passages using such mixing blades or vanes are problematic in that the pressure of the coolants is undesirably reduced in inverse proportion to the expected coolant mixing effect, and so the two techniques are undesirably limited in their coolant mixing effects. That is, a wake stream, disturbing the main flow of the coolants, or a vortex flow of the coolants, generated at positions around the bent portions of the mixing blades or vanes, is enhanced in proportion to the size or the bending angle of the mixing blades or vanes, which is enlarged for enhancing the lateral flow or swirl flow of the coolants within a nuclear fuel assembly. Therefore, the pressure of the coolants in such a case is reduced to limit the enhancement of the desired lateral flow or the desired swirl flow of the coolants. This limits the size and bending angles of the mixing blades or the vanes, and limits the thermal hydraulic efficiency of the nuclear fuel assembly.

In addition, a nozzle type double sheet spacer grid, comprising two sets of intersecting inner strips each consisting of two sheets specifically deformed and integrated together to define coolant channels (nozzles) between the two sheets, has been proposed. In the nozzle type double sheet spacer grid, the inlet and outlet of each nozzle are inclined relative to the axes of the fuel rods at a predetermined angle of inclination, thus producing a swirl flow of coolant at the inlet and outlet of the nozzle. Such a swirl flow of coolant improves the heat transfer effect between the fuel rods and the coolant within a nuclear fuel assembly.

Such a nozzle type double sheet spacer grid having the two sets of double sheet inner strips is referred to U.S. Pat. No. 4,726,926, and U.S. Pat. No. 6,130,927 (corresponding to Korean Patent No. 265,027).

The above nozzle type double sheet spacer grids, designed to form a lateral flow of coolants or to deflect and mix the coolants within a nuclear fuel assembly, are somewhat advantageous in that they more effectively mix the coolants and improve the heat transfer effect between the fuel rods and the coolants within a nuclear fuel assembly. However, such a conventional nozzle type double sheet spacer grid is problematic in that the lateral flow or mixing of coolants regrettably vibrates the elongated, parallel, closely spaced fuel rods within the fuel assembly.

In the conventional spacer grids for nuclear fuel assemblies with the fuel rods 125 supported by both the positioning springs 119 and the positioning dimples 120 within the four-walled cells of the grids 110, the fuel rods 125 during an operation of a nuclear fuel assembly 101 briefly and periodically interfere with the intersecting strips of the spacer grids due to vibrations caused by the lateral flow of coolants. When the fuel rods 125 are so vibrated over a lengthy period of time, the claddings of the fuel rods 125 are repeatedly and frictionally abraded at their contact parts at which the fuel rods 125 are brought into contact with the springs and dimples of the spacer grids. The claddings are thus reduced in their thickness so as to be finally perforated at said contact parts. Such an abrasion of the fuel rods is so-called fretting wear in the art.

Detailed description of such a fretting wear may be referred to U.S. Pat. No. 4,702,881 (corresponding to Korean Patent Publication No. 94-3799).

The laterally directed force caused by the mixing blades of the spacer grids is in proportion to the coolant mixing effect, and directly affects the heat transfer effect of nuclear reactors. However, such a laterally directed force of the mixing blades also proportionally increases the amplitude of vibration of the fuel rods. This may cause damage to the fuel rods.

While designing the spacer grids having such mixing blades, the fuel rod support parts, such as positioning springs and dimples, are recognized as very important factors in recent years.

Other important factors to consider while designing the spacer grids for use in nuclear fuel assemblies are both the fuel rod supporting function of the spacer grids and the buckling strength capable of resisting such a laterally directed force acting on the grids.

During an operation of a nuclear reactor, the fuel assemblies may be vibrated laterally due to load acting on the fuel assemblies and this causes interference between the fuel assemblies. Therefore, the spacer grids of the fuel assemblies may be impacted due to such interference between the fuel assemblies as disclosed in U.S. Pat. No. 4,058,436.

In the prior art, the spacer grid's buckling strength, resisting a lateral load acting on the spacer grid, is undesirably reduced since the strips of the spacer grid must be partially removed, for example, through a stamping process at a plurality of portions so as too form positioning springs and dimples. Such cut-away portions reduce the effective cross-sectional area of the spacer grid capable of resisting impact, and reduce the buckling strength of the spacer grid.

In a spacer grid disclosed in U.S. Pat. No. 5,243,634, the positioning springs are individually integrated with an associated grid strip at one point, thus forming a cantilever structure. Such a cantilever spring is more flexible than an equal-arm spring, which is integrated with a grid strip at both ends thereof to form an equal-arm structure.

In the spacer grid disclosed in the above-mentioned U.S. Pat. No. 4,726,926, the deformed portions, provided on the sheets of the intersecting grid strips for forming the coolant channels (nozzles), collaterally act as positioning springs used for receiving and supporting the fuel rods within the four-walled cells of the grid.

That is, the sheets of each grid strip are not cut away, but deformed to form such coolant channels (nozzles), so that the nozzle type positioning springs are integrated with a grid strip at both sides and both ends thereof. The strength of the nozzle type springs is thus higher than that of conventional equal-arm springs. The nozzle type springs are thus greatly reduced in their elastic ranges, so that the nozzle type springs act as dimples rather than springs. The nozzle type springs are thus so-called "nozzle type dimples".

Therefore, the above-mentioned spacer grid, having such nozzle type dimples and supporting the elongated fuel rods using only the nozzle type dimples without having springs, is problematic in that the dimples may cause the fuel rods to be undesirably bent when the fuel rods are elongated due to the irradiation-induced growth during an operation of the reactor. In addition, this spacer grid is reduced in its elastic range, wherein the spacer grid effectively and elastically supports the fuel rods in the fuel assembly, and so the spacer grid may be apt to lose its spring function during a grid manufacturing process, during fuel rods installing process, or when the fuel rods are elongated due to the irradiation-induced growth during an operation of the nuclear reactor. In such a case, the spacer grid may undesirably lose its function of effectively receiving and supporting the fuel rods within a nuclear fuel assembly and restricting undesired vibration of the fuel rods.

In an effort to overcome the above-mentioned problems experienced in the conventional single sheet and double sheet spacer grids, the inventors of the present invention proposed a nozzle type double sheet spacer grid for nuclear fuel assemblies in U.S. patent application Ser. No. 09/862,383 (corresponding to Korean Patent Application No. 2001-14474).

The above nozzle type double sheet spacer grid has mixing blades used in a conventional single sheet spacer grid, in addition to having coolant channels (nozzles) used for mixing the low temperature coolant with the high temperature coolant in the same manner as disclosed in U.S. Pat. No. 6,130,927 (corresponding to Korean Patent No. 265,027), thus having advantages expected from both the mixing blades of the conventional single sheet spacer grid and the coolant channels of the conventional nozzle type double sheet spacer grid, and improving thermal efficiency of the fuel assemblies. The above nozzle type double sheet spacer grid also has an enhanced spring function of supporting the fuel rods within a fuel assembly, thus reducing fretting wear of the fuel rods caused by flow-induced vibration of the fuel rods within the nuclear fuel assembly.

In addition, the above nozzle type double sheet spacer grid for nuclear fuel assemblies is designed such that the intersecting strips are not cut away at any portion, thus maintaining a desired effective sectional area thereof, and thereby having a desired buckling strength capable of effectively resisting lateral load acting thereon. The nozzle type double sheet spacer grid thus improves the thermal hydraulic strength and mechanical strength of the fuel assembly. The above nozzle type double sheet spacer grid also increases the elastic range of the positioning springs, and increases the number of fuel rod contact points and fuel rod contact areas, thus effectively and smoothly receiving and supporting the fuel rods within the fuel assembly, different from the other conventional double sheet spacer grids. The above nozzle type double sheet spacer grid supports the fuel rods at the increased number of contact points, and so the spacer grid effectively supports an elastic displacement of the fuel rods, different from conventional spacer grids supporting such elastic displacement by only the positioning springs, thus overcoming the problems experienced in the conventional nozzle type positioning springs having excessively high strength.

However, the above nozzle type double sheet spacer grid is problematic in terms of the performance of nozzle type springs directly supporting the fuel rods in a fuel assembly. Regardless of various efforts to improve the spring performance, the nozzle type springs of the above double sheet spacer grid inevitably have high strength in comparison with the springs of conventional single sheet spacer grids, so that the double sheet spacer grid may fail to allow the fuel rods to smoothly slide on the support points of the springs in the case of irradiation-induced growth of the fuel rods, thus undesirably resulting in a bending of the fuel rods. In addition, the double sheet spacer grid regrettably has a reduced elastic range, wherein the grid effectively supports the fuel rods in the fuel assembly, and so the double sheet spacer grid may lose its spring function during a grid manufacturing process, during fuel rods installing process, or when the fuel rods are elongated due to the irradiation-induced growth of the fuel rods during an operation of a nuclear reactor. In such a case, the double sheet spacer grid undesirably loses its function of effectively restricting undesired vibration of the fuel rods, so that the fuel rods may be severely damaged due to flow-induced vibrations caused by the flow of coolants in the fuel assembly.

SUMMARY OF THE INVENTION

Accordingly, the present invention has been made keeping in mind the above problems occurring in the prior art, and an object of the present invention is to provide a side-slotted nozzle type double sheet spacer grid for nuclear fuel assemblies, which is designed to remarkably enhance the performance of springs supporting the fuel rods in a fuel assembly, in addition to providing the function of coolant channels (nozzles) used for mixing the low temperature coolant with the high temperature coolant, thus effectively protecting the fuel rods from fretting wear caused by flow-induced vibrations within the fuel assembly.

Another object of the present invention is to provide a side-slotted nozzle type double sheet spacer grid for nuclear fuel assemblies, which is designed to overcome the problems of conventional nozzle type springs having high strength, and have the advantages of conventional spacer grids having springs and dimples capable of effectively supporting the elastic displacement of the fuel rods different from spacer grids having only springs, thus allowing increased elastic displacement of the fuel rods in a nuclear fuel assembly.

In order to accomplish the above objects, the present invention provides a side-slotted nozzle type double sheet spacer grid for nuclear fuel assemblies, comprising a plurality of inner strips intersecting each other at a predetermined angle to form a plurality of four-walled cells to receive and support a plurality of fuel rods in the spacer grid, each of the inner strips comprising a plurality of unit strip parts each of which is fabricated by integrating two unit sheet parts together into a single structure, such that the two unit sheet parts face each other and a nozzle type coolant channel with an inlet and an outlet is defined between the two unit sheet parts, wherein each of the unit sheet parts is provided with a slot longitudinally formed on each side surface of a spring which is projected from the unit sheet part to support a fuel rod within a four-walled cell.

In the above side-slotted nozzle type double sheet spacer grid, the slot has a width in the range from 0.35 mm to 0.8 mm, and a length in the range from 12 mm to 16 mm.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a perspective view, showing the construction of a typical nuclear fuel assembly for use in pressurized light water reactors;

FIG. 2 is a partial perspective view of a conventional spacer grid used for receiving and supporting elongated fuel rods in the fuel assembly of FIG. 1;

FIG. 3 shows a fuel rod, received and supported by positioning springs and dimples within a four-walled cell of the spacer grid of FIG. 1, in a front view and a plan view;

FIG. 4 is a plan view, showing four fuel rods received and supported within four cells of the spacer grid of FIG. 1 to form a 2×2 array, with coolant passages formed around each fuel rod within each cell;

FIG. 5 is a perspective view of a side-slotted nozzle type double sheet spacer grid for nuclear fuel assemblies having a 5×5 array in accordance with a primary embodiment of the present invention;

FIG. 6 is a perspective view of the spacer grid of FIG. 5, with perimeter strips removed from the periphery of the grid;

FIG. 7 is a perspective view of a unit sheet part that constitutes a double sheet strip used in the spacer grid of FIG. 5, and does not have any coolant channel outlet at an upper end thereof;

FIG. 8 is a perspective view of a unit sheet part that constitutes a double sheet strip used in the spacer grid of FIG. 5, and has coolant channel outlets at an upper end thereof;

FIG. 9 is a perspective view of a side-slotted nozzle type double sheet spacer grid for nuclear fuel assemblies having a 5×5 array in accordance with a second embodiment of the present invention;

FIG. 10 is a perspective view of a unit sheet part that constitutes a double sheet strip used in the spacer grid of FIG. 9, and does not have any coolant channel outlet at an upper end thereof, with two mixing blades provided at the upper end;

FIG. 11 is a perspective view of a unit sheet part that constitutes a double sheet strip used in the spacer grid of FIG. 9, and does not have any coolant channel outlet at an upper end thereof, with one mixing blade provided at the upper end;

FIG. 12 is a perspective view of a perimeter strip fabricated by integrating an inner thin sheet, comprising unit sheet parts of FIG. 8 each having two coolant channel outlets, with a flat outer thin sheet into a single structure;

FIG. 13 is a perspective view of a perimeter strip fabricated by integrating an inner thin sheet, comprising unit sheet parts each having a deformed coolant channel outlet in accordance with another embodiment of the present invention, with a flat outer thin sheet into a single structure; and FIG. 14 is a graph showing displacements as a function of load for side-slotted unit sheet parts of FIGS. 7, 8, 10 and 11 according to the present invention and a unit sheet part of a conventional slotless nozzle type double sheet spacer grid not having any slot, the displacements being measured by a universal testing machine to measure the spring performances of the unit sheet parts.

DESCRIPTION OF THE PREFERRED EMBODIMENTS

Reference should now be made to the drawings, in which the same reference numerals are used throughout the different drawings to designate the same or similar components.

FIG. 5 is a perspective view of a side-slotted nozzle type double sheet spacer grid for nuclear fuel assemblies having a 5×5 array in accordance with a primary embodiment of the present invention. FIG. 6 is a perspective view of the spacer grid of FIG. 5, with the perimeter strips removed from the periphery of the grid. In the spacer grid of FIGS. 5 and 6, one fuel rod is shown for ease of description.

As shown in the drawings, the side-slotted nozzle type double sheet spacer grid 310 according to the primary embodiment of the present invention receives and supports a plurality of elongated nuclear fuel rods 325 in a nuclear fuel assembly, and comprises a plurality of double sheet inner strips 316 and four double sheet perimeter strips 320. The inner strips 316 intersect each other at right angles in accordance with a designed array, and are encircled with the four perimeter strips 320, thus forming an egg-crate pattern with a plurality of four-walled cells for receiving and supporting the elongated nuclear fuel rods 325. Each of the inner strips 316 comprises a plurality of unit strip parts, each being fabricated by integrating two different unit sheet parts, that is, first and second unit sheet parts 361 and 362, together into a single structure, such that the two unit sheet parts 361 and 362 face each other and a nozzle type coolant channel with one inlet and at least one outlet is defined between the two unit sheet parts 361 and 362. Each of the four perimeter strips 320 is fabricated by integrating an inner thin sheet comprising the unit sheet parts 362 with a flat outer thin sheet 410 having a width corresponding to the width of the inner thin sheet into a single structure.

The inner strips 316 each have a plurality of notches (not shown) at the junctions of the unit strip parts such that each notch vertically extends downward or upward from upper or lower edge of each inner strip 316. The inner strips 316 are assembled with each other by intersecting together at right angles at the notches, and are welded together at intersections thereof. In addition, the junctions of the intersecting inner strips 316 and the four perimeter strips 320 are welded at the outside of the perimeter strips 320 through a seaming process, thus producing a desired double sheet spacer grid with the four-walled cells for the nuclear fuel rods 325. In the present invention, the welding process for the intersections of the inner strips 316 may be performed through a conventional welding process, such as a TIG welding process, an electron beam welding process or a laser beam welding process.

The thin sheets of each of the inner and perimeter strips 316 and 320 are continuously welded together at the junctions thereof, thus enhancing the buckling strength of the spacer grid and allowing the spacer grid to more effectively resist laterally directed force acting on the spacer grid.

When two unit sheet parts 361 and 362 are integrated into a unit strip part, a nozzle type coolant channel with one inlet and at least one outlet is formed between the two unit sheet parts 361 and 362. In such a case, the two unit sheet parts 361 and 362 have predetermined shapes, each defining a half of the cross-sectional area of the coolant channel. The two unit sheet parts 361 and 362 of each unit strip part are designed such that a coolant channel inlet having a predetermined cross-sectional area is formed at an upstream end of the channel, that is, at the lower end of the unit strip part. The cross-sectional area of the coolant channel gradually increases to be maximized at a position around a spring at which the unit strip part comes into contact with a fuel rod. The cross-sectional area is gradually reduced after the spring to become zero at a downstream end of the channel, that is, at the upper end of the unit strip part. Therefore, the upper edges of the two unit sheet parts 361 and 362 are in contact with each other when the two sheet parts 361 and 362 are integrated into a unit strip part.

The coolant channel of each unit strip part has one or more outlets 355 formed by cutting an upper portion of the second part 362 of the two unit sheet parts 361 and 362. For example, in the spacer grid 310 of FIGS. 5 and 6, each second unit sheet part 362 has two symmetric coolant channel outlets 355, while each first unit sheet part 361 does not have any coolant channel outlet.

In the spacer grid 310, each of the inner strips 316 is fabricated by integrating two thin sheets into a single structure. Each of the two thin sheets has an alternating arrangement of a plurality of first unit sheet parts 361 not having any coolant channel outlet and a plurality of second unit sheet parts 362 each having two coolant channel outlets 355. When fabricating each inner strip 316, the two thin sheets are preferably arranged such that one first unit sheet part 361 and one second unit sheet part 362 form one unit strip part. The outlets 355 of each inner strip 316 are thus alternately arranged at left and right sides as shown in FIGS. 5 and 6.

Each of the two unit sheet parts 361 and 362 is provided with a slot 315 longitudinally formed on each side surface of a spring which is projected from each unit sheet part to support a fuel rod 325 within a four-walled cell.

FIGS. 7 and 8 are perspective views respectively showing a first unit sheet part 361 not having any coolant channel outlet, and a second unit sheet part 362 having two symmetric coolant channel outlets 355. The shapes of the slots 315 as well as the shapes of the two unit sheet parts 361 and 362 may be easily appreciated from the above drawings.

In the side-slotted nozzle type double sheet spacer grid 310 of FIGS. 5 and 6, the sheets of each double sheet inner strip 316 are fabricated by an alternating arrangement of a plurality of first unit sheet parts 361 of FIG. 7 not having any coolant channel outlet and a plurality of second unit sheet parts 362 of FIG. 8 each having the two coolant channel outlets 355.

Different from conventional nozzle type double sheet spacer grids, the side-slotted nozzle type double sheet spacer grid 310 of the present invention enhances its spring performance due to the slot 315 longitudinally formed on each side surface of the springs of the unit sheet parts 361 and 362, such that the spring performance of the present spacer grid 310 almost approaches a level which is expected from equal-arm springs of a conventional single sheet spacer grid. The spacer grid 310 of the present invention thus has a high buckling strength, effectively resisting a lateral load acting on the spacer grid 310, since the spacer grid 310 supports the fuel rods 325 while surrounding them when the lateral load is applied from the fuel rods 325 to the spacer grid 310.

The slot 315 of the spacer grid 310 has a width in the range from 0.35 mm to 0.8 mm, preferably in the range from 0.3 mm to 0.6 mm, and a length in the range from 12 mm to 16 mm. When the slot 315 is designed to have the above-mentioned size, it is possible for the spacer grid 310 to have the desired spring performance.

FIG. 9 is a perspective view of a side-slotted nozzle type double sheet spacer grid for nuclear fuel assemblies having a 5×5 array in accordance with a second embodiment of the present invention. Different from the spacer grid of FIGS. 5 and 6, the spacer grid of FIG. 9 further includes at least one mixing blade at each unit sheet part. FIGS. 10 and 11 are perspective views showing unit sheet parts 365 and 366 that constitute a double sheet strip used in the spacer grid of FIG. 9. The unit sheet part 365 of FIG. 10 is fabricated by forming both a swirl flow blade 330 and a lateral flow blade 335 at the upper end of the unit sheet part 361 of FIG. 7 not having any coolant channel outlet. The unit sheet part 366 of FIG. 11 is fabricated by forming a swirl flow blade 330 at the upper end of the unit sheet part 361 of FIG. 7.

As shown in FIG. 9, the spacer grid according to the second embodiment of the present invention is designed to enhance the coolant mixing efficiency. In order to accomplish the above object, each of the double sheet strips of the spacer grid includes unit sheet parts 365 and 366 each having one or more mixing blades 330 and/or 335 at the upper end thereof. The mixing blades of the spacer grid of FIG. 9 may be selected from the swirl flow blades 330 creating a swirl flow of coolants at the intersections of the strips in the spacer grid, the lateral flow blades 335 creating a lateral flow of coolants between neighboring four-walled cells, and a combination of the swirl flow blades 330 and the lateral flow blades 335. That is, the unit sheet part of the double sheet strips according to the second embodiment may have both a swirl flow blade and a lateral flow blade as shown in FIG. 10, or have a swirl flow blade or a lateral flow blade as shown in FIG. 11, or have two swirl flow blades or two lateral flow blades (not shown).

The spacer grid according to the second embodiment of the present invention may be fabricated by a combination of the unit sheet parts 365 each having a swirl flow blade 330 and a lateral flow blade 335 as shown in FIG. 10, the unit sheet parts 366 each having a swirl flow blade 330 as shown in FIG. 11, and the unit sheet parts 362 each having two coolant channel outlets 355 as shown in FIG. 8.

FIGS. 12 and 13 are perspective views of perimeter strips 320 which may be used in the spacer grids according to the primary and second embodiments of the present invention. That is, the perimeter strips 320 may encircle the intersecting inner strips 310 of FIG. 6 having the unit sheet parts 361 and 362 of FIGS. 7 and 8, or encircle the intersecting inner strips 318 of FIG. 9 having the unit sheet parts 362, 365 and 366 of FIGS. 8, 10 and 11, thus producing a spacer grid of the present invention. Due to the perimeter strips 320, it is possible to fabricate a spacer grid without any difference in the fuel rod support performance between the inside four-walled cells positioned at the inner area of the spacer grid and the outside four-walled cells positioned at the outer area of the spacer grid.

The perimeter strips 320 are fabricated by integrating an inner thin sheet, comprising a plurality of unit sheet parts 421 or 422 each having at least one coolant channel outlet 355 or 356, with a flat outer thin sheet 410 into a single structure. That is, the perimeter strips 320 may be fabricated using the unit sheet parts 421 each having two coolant channel outlets 355 as shown in FIG. 12, or using the unit sheet parts 422 each having one deformed coolant channel outlet 356 as shown in FIG. 13.

In the spacer grid of the present invention, the cross-sectional area of each coolant channel of the perimeter strips 320 is a half of the cross-sectional area of each coolant channel of the inner strips 316 and 318, so desired symmetry of the spring performance and coolant mixing efficiency in the spacer grid is accomplished regardless of the positions of the inside and outside four-walled cells.

In a side-slotted nozzle type double sheet spacer grid 310 of the present invention, the inner strips 316 or 318 and the perimeter strips 320 are each fabricated by integrating two stamped thin sheets together into a single structure. Each of the thin sheets of the inner and perimeter strips is preferably made of zircaloy, which is the alloy of tin, iron, chrome and zirconium. It is also possible to make the thin sheets of the strips using inconel, which has been typically used as a material of the grid strips in the prior art.

In the spacer grid of the present invention, each of the inner and perimeter strips 316, 318 and 320 preferably has a thickness in the range from 0.25 mm to 0.40 mm, and each of the springs of the unit sheet parts 361, 362, 365 and 366 preferably has a width in the range from 7 mm to 10 mm between both side edges thereof.

FIG. 14 is a graph showing displacements as a function of load for side-slotted unit sheet parts of FIGS. 7, 8, 10 and 11 according to the present invention and a unit sheet part of a conventional slotless nozzle type double sheet spacer grid not having any slot, the displacements being measured by a universal testing machine to measure the spring performances of the unit sheet parts. In the graph, the first and second slotted unit sheet parts are the side-slotted unit sheet parts of the present invention, having slots with different lengths. That is, the first slotted unit sheet part has a shorter slot, and the second slotted unit sheet part has a longer slot.

In the graph, the spring performance, that is, the spring strength of each unit sheet part, is represented by the gradient of an associated displacement-load curve. The graph shows that the side-slotted unit sheet parts of the present invention have improved spring performances regardless of the shapes thereof, and the spring strength of the side-slotted unit sheet parts is lower than that of the conventional slotless unit sheet part. In accordance with the test, the spring strength of each side-slotted unit sheet part represented by the gradient of an associated displacement-load curve is linearly changed, and the elastic range of the side-slotted unit sheet part, wherein the displacement-load curve is shown as a linear curve with the same gradient, is enlarged by appropriately designing the slots 315. Therefore, it is noted that the side-slotted nozzle type double sheet spacer grid 310 of the present invention having the longitudinal slots 315 has enhanced spring performance.

As described above, the present invention provides a side-slotted nozzle type double sheet spacer grid for nuclear fuel assemblies. In the spacer grid of the present invention, a plurality of inner strips intersect each other at a predetermined angle to form a plurality of four-walled cells to receive and support a plurality of fuel rods. Each of the inner strips comprises a plurality of unit strip parts, and each of the unit strip parts is fabricated by integrating two unit sheet parts together into a single structure, such that the two unit sheet parts face each other and a nozzle type coolant channel is defined between the two unit sheet parts. Due to the coolant channels of the unit strip parts, the spacer grid of the present invention effectively deflects and mixes coolants together so as to enhance the heat transfer effect between the fuel rods and the coolants. The cross-sectional area of each coolant channel gradually increases, and a portion of each unit sheet part at which the coolant channel has the maximum cross-sectional area acts as a spring at which the unit sheet part comes into contact with a fuel rod. Therefore, the present spacer grid supports a fuel rod at the four sides within a four-walled cell, so that the spacer grid more stably supports the fuel rods in comparison with conventional single sheet spacer grids which support a fuel rod by one spring within a four-walled cell and may fail to stably support a unidirectional displacement of fuel rods caused by flow-induced vibration in a fuel assembly.

In the spacer grid of the present invention, each of the unit sheet parts is provided with a slot longitudinally formed on each side surface of the spring. Due to the slots, the spacer grid desirably reduces its spring strength while maintaining advantages of conventional nozzle type double sheet spacer grids. The spacer grid of the present invention thus accomplishes desired soundness of a nuclear fuel assembly. The present spacer grid desirably reduces the strength of the springs that directly support the fuel rods, and enlarges the elastic range wherein the spacer grid effectively and elastically supports the fuel rods in the fuel assembly, so that the spacer grid more stably supports the fuel rods. The spacer grid also prevents its springs from being damaged during a process of installing fuel rods in the spacer grid while producing a nuclear fuel assembly, thus effectively protecting the fuel rods from fretting wear caused by flow-induced vibrations within the fuel assembly.

FIG. 14 is a graph showing the spring performance of the side-slotted nozzle type double sheet spacer grid according to the present invention, measured by a universal testing machine. In the graph, the spring performance, that is, the spring strength of the spacer grid, is represented by the gradient of a displacement-load curve. As shown in the graph, a conventional slotless nozzle type double sheet spacer grid has high spring strength, and its displacement-load curve varies with an refraction point when the displacement exceeds a reference level. This means that the spring strength of the slotless spacer grid, represented by the gradient of the displacement-load curve, is high. However, the side-slotted nozzle type double sheet spacer grid of the present invention is reduced in its spring strength and enlarges its elastic range, wherein the displacement-load curve is shown as a linear curve with the same gradient. It is thus noted from the test that the spacer grid of the present invention has improved spring performance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A side-slotted nozzle type double sheet spacer grid for nuclear fuel assemblies, comprising a plurality of inner strips intersecting each other at a predetermined angle to form a plurality of four-walled cells to receive and support a plurality of fuel rods in the spacer grid, each of said inner strips comprising a plurality of unit strip parts each of which is fabricated by integrating two unit sheet parts together into a single structure, such that the two unit sheet parts face each other and a nozzle type coolant channel with an inlet and an outlet is defined between the two unit sheet parts, wherein each of said unit sheet parts is provided with a slot longitudinally formed on each side surface of a spring which is projected from the unit sheet part to support a fuel rod within a four-walled cell.

2. The side-slotted nozzle type double sheet spacer grid according to claim 1, wherein the slot has a width in the range from 0.35 mm to 0.8 mm, and a length in the range from 12 mm to 16 mm.

3. The side-slotted nozzle type double sheet spacer grid according to claim 1, wherein each of the inner strips is fabricated by integrating two thin sheets, each comprising an alternating arrangement of a plurality of first unit sheet parts not having any coolant channel outlet and a plurality of second unit sheet parts each having a coolant channel outlet, into a single structure such that one first unit sheet part and one second unit sheet part form one unit strip part.

4. The side-slotted nozzle type double sheet spacer grid according to claim 3, wherein the intersecting inner strips are encircled with a plurality of perimeter strips, each of said perimeter strips being fabricated by integrating an inner thin sheet comprising the second unit sheet parts each having the coolant channel outlet, and a flat outer thin sheet into a single structure.

5. The side-slotted nozzle type double sheet spacer grid according to claim 4, wherein each of said inner and perimeter strips has a thickness in the range from 0.25 mm to 0.40 mm, and each of the springs of said unit sheet parts has a width in the range from 7 mm to 10 mm between both side edges thereof.

6. The side-slotted nozzle type double sheet spacer grid according to claim 4, wherein each of the first unit sheet parts not having any coolant channel outlet comprises one or more coolant mixing blades extending from an upper end thereof.

7. The side-slotted nozzle type double sheet spacer grid according to claim 6, wherein the coolant mixing blades of the first unit sheet parts comprise lateral flow blades for creating a lateral flow of coolants between neighboring four-walled cells, swirl flow blades for creating a swirl flow of coolants at intersections of the strips in the spacer grid, or a combination of the swirl flow blades and the lateral flow blades.

* * * * *